Patented Feb. 16, 1943

2,311,235

UNITED STATES PATENT OFFICE 2,311,235

DIABETIC AND DIETETIC FOOD PRODUCT

Joseph Kuderman, Detroit, Mich.

No Drawing. Application July 5, 1941,
Serial No. 401,293

9 Claims. (Cl. 99—141)

This invention relates to sweetened food products, and more particularly to diabetic and dietetic food products.

Heretofore in the sweetening of food for diabetics saccharin has been used to replace sugar in order to eliminate an excess thereof where its presence in the blood is detrimental. However, it has been found that saccharin when used in tea or coffee or in other foods leaves an unfavorable after-taste; and on the other hand when used for cooking or baking it leaves a bitter after-taste.

It is the object of this invention to eliminate the use of saccharin and in its place substitute a sorbitol compound as a sweetening agent. Sorbitol is an alcohol sugar having a formula of $C_6H_{14}O_2$ which is broken down molecularly as follows:

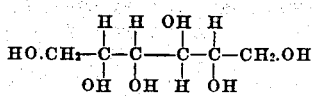

This compound occurs in ripe mountain ash, berries, cherries, plums, pears, apples, etc.; and is produced chemically from dextrose by treating with hydrogen under pressure.

Sorbitol is colorless or in the form of white crystals, and is soluble in water or in alcohol.

Sorbitol does not increase the sugar content of the blood of a diabetic, leaves no after-taste or digestion disturbance. This product is a substitute for carbohydrates and has a definitely sweet taste. In this respect the same is readily useful in a dietetic diet, because it has a caloric value substantially equal to glucose.

Sorbitol as a therapeutic agent provides a substitute sugar, and is a potential food having nutritional value. Sorbitol as a sweetening agent requires from two-thirds up to one ounce per glass of tea, coffee, etc.; however, it has been found that the use of sorbitol is limited to substantially small amounts.

It is the object of this invention to produce a sweetening food compound which will give the diabetic patient his daily requirement of sweets without injuring his health.

By chemically combining mannitol and dulcin with sorbitol, I have produced a concentrated sweetening agent which enables the diabetic to cover his daily requirements completely, and at the same time not to transgress the medically prescribed limits of sorbitol or mannitol.

By employing dulcin 80 to 90 per cent less sorbitol or mannitol is needed than before as a sweetening agent for tea, coffee and other foods.

Mannitol having a formula $C_6H_{14}O_6$ is isomeric with sorbitol and is broken down as follows molecularly:

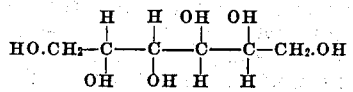

Mannitol is also an alcohol sugar widely distributed in nature and is obtained from manna. The latter is found in the Mediterranean Basin, Asia Minor and Spain and contains 40 to 60 per cent mannitol.

This substance which consists of white crystals and is soluble in water or alcohol, is a mild laxative, is used in diabetes, and may be assimilated without the formation of sugar.

Dulcin is an artificial body not soluble in water, but which I have found may be dissolved with mannitol or sorbitol.

Dulcin $C_9H_{12}O_2N_2$ is produced by treating phenetidin with phosgene and then with ammonia. This compound consists of white lustrous needles and has a very sweet taste, being 150 to 250 times as sweet as cane sugar. In this connection for comparison it will be noted that saccharin is 500 times as sweet as sugar.

The compound developed by the mixture of sorbitol, mannitol and dulcin is a concentrated sweetening agent for diabetics and may be used for tea, coffee, lemonades, compotes, jams, marmalades, ice cream, chocolate, candy, baked goods and other sweets.

It is well tasting, harmless for diabetics, even in unlimited quantities and may be used in cooking and baking.

Dulcin is more readily dissolved by adding one part soda bicarbonate in water with one to two parts dulcin and two to four parts of mannitol. On the other hand, hot water may be used for speeding up the dissolving of the dulcin by the mannitol and sorbitol.

By experiment I have found that the preferable embodiment of my invention is obtained by combining the above elements as follows:

| | Parts |
|---|---|
| Sorbitol | 40–60 |
| Mannitol | 5–8 |
| Dulcin | 1–2 |
| Water | 10–20 |

I have found that the addition of two to three parts soda bicarbonate substantially accelerates the formation of a complete solution, however, this substance is not absolutely necessary in the production of the compound and therefore may be omitted.

While a preferable embodiment of the diabetic food product is above set out, I find that the proportions of the respective constituents may be varied as follows:

| | Parts |
|---|---|
| Sorbitol | 30–96 |
| Mannitol | 3–85 |
| Dulcin | 1–4 |
| Water | 5–20 |
| Soda bicarbonate | 1–5 |

These elements and compounds are mixed together in solution. It is seen that by reducing the sorbitol the mannitol may be increased.

The end product after drying is white and has an appearance substantially identical with sugar. It may be put in the form of powder, lumps, tablets, syrup, etc.

It will be noted that the diabetic product keeps indefinitely and that no preservative is required.

I have found that where desired to form cubes or tablets, in order to insure the practical flow of the raw materials through the pressing operation by machine, and to avoid the material sticking to the moulds, that this process is facilitated by the addition to the mixture of substantially 10 parts calcium lacticum.

It will be noted that this element is not essential but if used its proportion may be varied in the combination between 5 and 25 parts.

Calcium lacticum as a drying agent is white and consists of lactic acid containing approximately 13% calcium, which is altogether harmless for the diabetic. Thus calcium lacticum is employed if the raw material is dry; but I have found that where the raw material is moist better results are obtained by using a similar proportion of gum acacium, i. e. the gum of the Acacia tree, together with olive oil.

The end product is a concentrated sweetening agent for diabetics and is characterized by the fact that it looks and tastes like ordinary sugar, but has no after-taste, is harmless and may be employed in cooking and baking.

The dulcin above described is dissolved with mannitol and sorbitol; contains almost no carbohydrates and in the indicated amounts is absolutely harmless for diabetics.

The above elements may also be combined in varied proportions with sugar to produce a concentrated sweetening agent of low carbohydrate value for dietetic purposes, to replace saccharin as a sweetening agent, and sugar, the latter of which is fattening causing or furthering corpulence. Furthermore the after-taste of saccharin is thereby eliminated.

In place of the 100% sugar or saccharin, the concentrated sweetening agent with sorbitol, mannitol and dulcin is used in relatively small amounts, whereby instead of 10 to 12 grams (one-half ounce) of sugar, only 1¼ to 2½ grams of sugar would be required for a cup of tea or coffee. Furthermore it is seen that for any sweetening purpose the sugar used may be reduced to one-fifth or one-sixth, i. e. the daily use of sugar is reduced 80 to 90 per cent. This is advantageous in preventing increases in weight, or in reducing. The concentrated artificial sweetening product is harmless, has very little food value and is excellent as a dietetic product. As a dietetic product the above substances are combined preferably as follows:

| | Parts |
|---|---|
| Sugar | 30–75 |
| Sorbitol | 25–30 |
| Dulcin | 1–2 |
| Mannitol | 4–8 |
| Water | 8–15 |

While the above is my preferable embodiment the following illustrates the various proportions that might be combined for obtaining substantially similar results:

| | Parts |
|---|---|
| Sugar | 25–80 |
| Sorbitol | 10–50 |
| Dulcin | 1–3 |
| Mannitol | 3–25 |
| Water | 5–20 |

When it is desired to accelerate the dissolving action 2 to 3 parts soda bicarbonate may also be employed I have found, however, that this compound may be varied approximately between 1 to 6 parts.

The end product may be put in the form of powder, lumps, tablets, etc. In the latter forms it has been found that the addition of calcium lacticum facilitates drying, as above set out. Preferably this may be used in the mixture in the proportion of 10 parts, however, the same may be varied between 5 and 25 parts. However, as above it has been pointed out that where the product is moist, gum acacium and olive oil produce a more satisfactory result.

The above described compound is a highly concentrated sweetening agent and may be used in all forms of sweets in a dietetic diet. The product therefore consists of the combination with sugar of a concentrated artificial sweetening agent.

Having described my invention reference should now be had to the claims which follow for determining the scope thereof.

I claim:

1. A crystalline sweetening substance comprising sorbitol, mannitol and dulcin.

2. A crystalline sweetening substance comprising 40 to 60 parts sorbitol, 5 to 8 parts mannitol, and 1 to 2 parts dulcin.

3. A crystalline sweetening substance comprising 30 to 96 parts sorbitol, 3 to 85 parts mannitol, and 1 to 4 parts dulcin.

4. A crystalline sweetening substance comprising sorbitol, mannitol, dulcin and sugar.

5. A crystalline substance comprising substantially 25 to 30 parts sorbitol, 4 to 8 parts mannitol, 1 to 2 parts dulcin, and 30 to 40 parts sugar.

6. A crystalline sweetening substance comprising substantially 10 to 50 parts sorbitol, 3 to 25 parts mannitol, 1 to 6 parts dulcin and 25 to 80 parts sugar.

7. A sweetening composition comprising an aqueous solution of sorbitol, mannitol and dulcin.

8. A sweetening composition comprising 8 to 15 parts water, 25 to 30 parts sorbitol, 4 to 8 parts mannitol, 1 to 2 parts dulcin and 30 to 40 parts sugar.

9. A naturally white crystalline sweetening substance comprising sorbitol, mannitol and dulcin.

JOSEPH KUDERMAN.